(12) United States Patent
Ashe et al.

(10) Patent No.: US 6,664,981 B2
(45) Date of Patent: *Dec. 16, 2003

(54) GRAPHICAL USER INTERFACE WITH HIERARCHICAL STRUCTURE FOR CUSTOMIZABLE MENUS AND CONTROL OBJECTS

(75) Inventors: Dylan B. Ashe, Sunnyvale, CA (US); Robert G. Johnston, Jr., Sunnyvale, CA (US); Joseph A. Ruff, Palo Alto, CA (US); Daniel Clifford, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/927,582

(22) Filed: Aug. 13, 2001

(65) Prior Publication Data

US 2002/0093523 A1 Jul. 18, 2002

Related U.S. Application Data

(63) Continuation of application No. 08/437,225, filed on May 8, 1995, now Pat. No. 6,307,574.

(51) Int. Cl.[7] ............................................... G06F 17/00

(52) U.S. Cl. ........................................ 345/765; 345/835
(58) Field of Search ................................. 345/762, 765, 345/744, 764, 781, 835

(56) References Cited

U.S. PATENT DOCUMENTS

| 5,596,695 A | * | 1/1997 | Hamada et al. ............. 345/762 |
| 5,600,778 A | * | 2/1997 | Swanson et al. ............ 345/762 |
| 5,959,624 A | * | 9/1999 | Johnston, Jr. et al. ...... 345/763 |

* cited by examiner

Primary Examiner—Cao (Kevin) Nguyen
(74) Attorney, Agent, or Firm—Burns, Doane, Swecker & Mathis, L.L.P.

(57) ABSTRACT

The program code for control objects in a graphical user interface is organized in a multi-level hierarchial structure. At one level of the structure, each different type of control defines a class of objects. The definition of a class includes most, if not all, of the functionality associated with the objects of that class. In addition, the class definition includes the overall structure of the object, such as the relative positions of different elements which make up the object. The actual appearance of these elements is defined by user selectable software that resides at a lower level of the hierarchy. Using this approach, only one instance of the program code which defines the functionality and overall structure of each object is required, resulting in smaller the overall memory requirements of the program code.

39 Claims, 3 Drawing Sheets

GRAPHICAL USER INTERFACE WITH HIERARCHICAL STRUCTURE FOR CUSTOMIZABLE MENUS AND CONTROL OBJECTS

This application is a continuation of application Ser. No. 08/437,225, filed on May 8, 1995 U.S. Pat. No. 6,307,574.

FIELD OF THE INVENTION

The present invention relates generally to graphical user interfaces for computers, and more particularly to a structure for control objects and menus of graphical user interfaces which permits their appearance to be customized while providing standardized functionality.

BACKGROUND OF THE INVENTION

The evolution of the computer industry is unparalleled in its rate of growth and complexity. Personal computers, for example, which began as little more than calculators having limited memory, tape-driven input capabilities and monochrome displays are now able to handle almost any data processing task with relative ease. While the ever-growing increase in computing power provided greater capabilities for application programmers and end users alike, the corresponding increase in complexity created an ease-of-use problem. Consequently, computer system designers were faced with a new challenge, namely to harness the available computing power in a form that was useable even by those with relatively little computer training, to ease the transition of users into a computer-based information paradigm.

In pursuit of this objective, in the early to mid-1980's many new input/output philosophies, such as "user friendly," "wysiwyg" and "menu driven" became popular. These approaches to the I/O function are particularly applicable to microcomputers, also known as personal computers, which are intended to appeal to a broad audience of computer users, including those who had no previous computer experience. An important aspect of computers which employ these input/output concepts was, and continues to be, the interface which allows the user to input commands and data and receive results. One particularly prevalent form of interface is known as a graphical user interface (GUI).

One popular type of GUI display is based on a visual metaphor which defines a monitor screen as a workspace known as a "desktop," in which the contents of documents are presented in relocatable regions known as "windows." In addition to windows, the graphical user interface includes a number of different types of control objects, which enable the user to select from available options presented by the computer's operating system and/or application programs, as well as provide feedback to the user. Menus are employed as another mechanism which permits the user to select from available options and provide input to the computer.

Originally, each graphical user interface had a fixed appearance and functionality. For a given user interface, each window would have the same appearance, regardless of its contents and the application programs running on the computer. For example, a window which displayed the contents of a word processing document would have the same structure and appearance as another window which contained the contents of a graphics document, even though they were associated with different applications programs and may have different sizes and locations on the display screen. Similarly, control objects and menus had the same appearance and functionality, regardless of the particular context within which they appeared. The appearances and functionality of the control objects and menus within the user interface were determined by the computer system designer at the time the operating system for the computer was being developed.

More recently, graphical user interfaces have become customizable, to present appearances different from the one created by the original system designer. With this approach software developers, and users, can change the appearance of the various graphical elements associated with the user interface. Thus, for example, one developer may design a user interface with a conservative theme, in which the various graphical elements have symmetrical shapes and are displayed with subdued colors, whereas another developer may design an interface with a more radical theme, using bright colors and elements of all sizes and shapes. The end users can select from among the different available themes, as desired. Thus, where a computer is used in a home environment, the parents may choose to have the conservative theme on the display while they are using the computer, whereas the children may prefer to switch to the radical theme when they are using it. Examples of user interfaces that can be customized to present different appearance themes are disclosed in copending, commonly assigned application Ser. Nos. 08/243,327, 08/242,963 and 08/243,268, filed May 16, 1994.

While the ability to customize the user interface to present different appearance themes greatly enhances the user experience, it also presents practical considerations regarding the size of the software program, and hence memory requirements that are imposed. More particularly, each different theme that is available to the user on a particular computer requires its own set of definitions for each of the elements of the interface. Thus, in the example given above, a conservative theme requires software that defines the appearance of windows, menus, and each of the available control objects. Similarly, the radical theme also requires its own set of software which contains a definition for each graphical element. Thus, as more and more themes are made available to the user, the amount of memory required to store the software for the various themes can increase significantly.

Another consideration that is raised by the ability to switch between various themes for the graphical user interface pertains to the consistency of options presented to the user. One of the attractive features of many graphical user interfaces, particularly for novice users, is the consistency of operation that is presented regardless of the particular application program that is being executed. For instance, if a window is not able to display the entire contents of a document, it may include scroll bars that can be actuated by the user to view different portions of a document. Similarly, it may contain a close box that enables the user to close the file containing the document and remove the window from the display. It is desirable to have the scroll bars and the close box appear at the same locations on all windows, regardless of the particular application program being executed. With this approach, the user only needs to learn one basic set of operations for windows, which will apply in all circumstances. The ability to customize the appearance of the user interface may cause this consistency of operation to be lost, however. For example, one developer may design a window in which the close box appears in the upper left corner of the window, while another designer may place it at a different location. Similarly, the scroll bars might be positioned along different edges of the respective windows. If these control objects have significantly different appearances in the respective themes, the user may become confused and frustrated if a different operation has to be learned for every different theme.

Accordingly, it is desirable to provide a structure which facilitates the customization of graphical user interfaces while minimizing the memory requirements and maintaining the consistency and reliability of operation between different appearances.

SUMMARY OF THE INVENTION

In accordance with the present invention, these objectives are achieved by organizing the program code relating to graphical user interface elements, such as menus and control objects, in a multi-level hierarchial structure. At one level of the structure, each different type of menu and control defines a class of objects. The definition of a class includes most, if not all, of the functionality associated with the objects of that class. In addition, the class definition can include the overall structure of the object, i.e., the relative positions of different elements which make up the object. The actual appearance of these elements, however, is defined by user selectable software that resides at a lower level of the hierarchy.

With this architecture, only one instance of the program code which defines the functionality and overall structure of each object is required, rather than being repeated for each theme. As a result, the overall memory requirements of the program code are smaller. In addition, since the functionality of each object remains the same, regardless of its specific appearance, greater consistency of operation is attained. As a further advantage, this architecture permits different drawing mechanisms for controlling the display of user interface elements, in accordance with different respective themes, to be supported within the same computer.

Further features of the present invention, as well as the advantages offered thereby, are explained in detail hereinafter with reference to specific embodiments illustrated in the accompanying drawings.

DETAILED DESCRIPTION

To facilitate an understanding of the present invention, its principles are described hereinafter with reference to specific types of menus and control objects. It will be appreciated, however, that the practical applications of the invention are not limited to the disclosed embodiments. Rather, with an understanding of the principles which underlie the invention, its applicability to many different types of graphical user interfaces, and the controllable elements within such interfaces, will be readily apparent.

Generally speaking, the present invention is directed to the architecture of a graphical user interface that runs on a computer. While the particular hardware components of a computer system do not form part of the invention itself, they are briefly described herein to provide a thorough understanding of the manner in which the features of the invention cooperate with the components of a computer system to produce the desired results.

Figure 1:
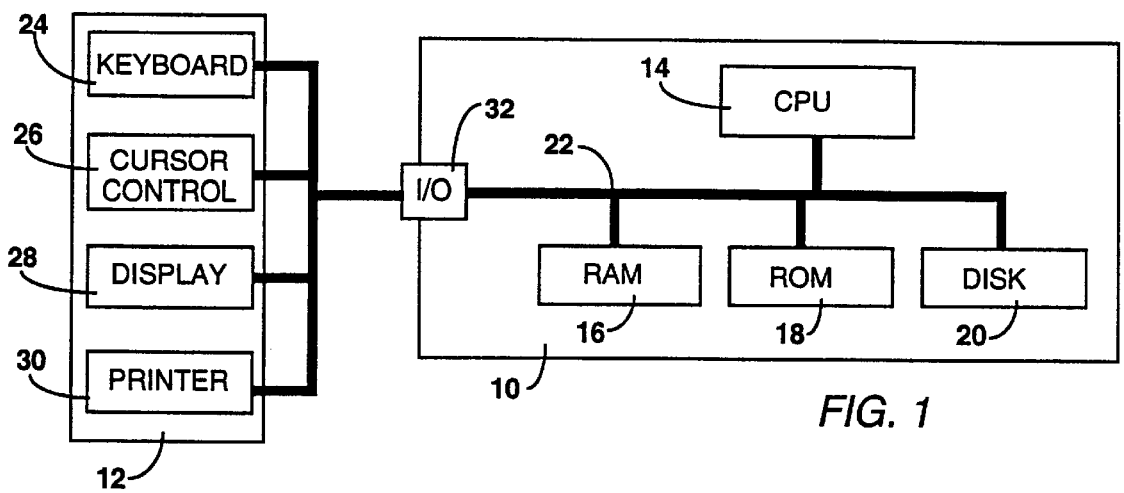
FIG. 1 is a block diagram of the hardware components of an exemplary computer system.

Referring to FIG. 1, an exemplary computer system includes a computer 10 having a variety of external peripheral devices 12 connected thereto. The computer 10 includes a central processing unit 14 and associated memory. This memory generally includes a main memory which contains the programs currently being executed on the computer, and which is typically implemented in the form of a random access memory 16. The associated memory also includes a non-volatile memory that can comprise a read-only memory 18, and a permanent storage device, such as a magnetic or optical disk 20, for storing all of the programs, as well as data files. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or an LCD screen, provides a visual display of the information that is being processed within the computer, for example the contents of a document or a computer-generated image. A hard copy of this information can be provided through a printer 30, or similar such device. Each of these external peripheral devices communicates with the CPU 14 by means of one or more input/output ports 32 on the computer.

In a computer system of this type, a graphical user interface can be presented on the display device 28 to provide the user with a convenient mechanism to control the operation of the computer and to receive feedback regarding such operation. The graphical user interface forms part of the computer's operating system that is loaded from the permanent storage memory 20 into the main memory 16 when the computer is started, and which is executed while the computer is running. To provide input and output functionality, the graphical user interface includes various types of menus and control objects which enable the user to select from available choices. Examples of such control objects include push buttons, via which the user can indicate acceptance of a particular action, radio buttons for selecting one of a number of available choices for a particular parameter, and check boxes for activating or deactivating various features. Other examples of such control objects include scroll bars for displaying different portions of a document within a window, sliders for adjusting variable values, such as the volume of a speaker, and disclosure triangles for displaying or hiding the contents of a folder or a pop-up menu. Typically, the user activates each of these various objects by positioning a cursor on it, using the cursor control device 26, and actuating the object, by pushing a button or the like on the cursor control device. Selection of menu items works in a similar manner. The user positions the cursor over the desired command displayed on the menu, and then presses or releases a control button on the cursor control device. When this occurs, the computer's operating system detects the position of the cursor, and if it is located over a menu command or a control object, executes the function associated with the selected command.

In addition to these user-actuated types of objects, via which a user can execute commands, the control objects may also include feedback devices, such as a progress indicator to inform the user of the rate at which a requested activity is being carried out, for example the downloading of a file or the conversion of a document from one format to another.

Each of these user interface objects has two main properties associated with it, namely its appearance and its functionality. The functionality of an object can relate to the command that is executed by the computer in response to actuating the object. For example, actuating a push button that is labelled "OK" can cause the computer to execute a particular action such as saving a document. The functionality associated with an object may also include a behavioral characteristic in which the object occupies different states in dependence upon user actions. For example, when a push button is actuated or a menu command is selected, it may go from a normal state to a highlighted state. In general, this functionality should remain the same, regardless of the particular application program running in the foreground of the computer at any given time, or the appearance of the interface object.

Figure 2:
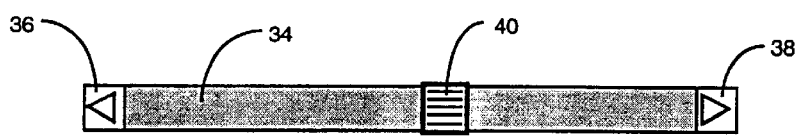
FIG. 2 is an illustration of a scroll bar.

The appearance characteristic of menus and control objects can be further divided into two aspects. One aspect pertains to the overall structure of each object. For example, a typical structure for a scroll bar is illustrated in FIG. 2. Referring thereto, the main elements of the scroll bar include a background area 34, left and right arrows 36 and 38 at the respective ends of the background area, and a "thumb" or slider 40 which the user can grab and position along the background. Preferably, every scroll bar which appears as part of the interface should have the same general structure, in which the various features are positioned relative to one another as shown in FIG. 2. Of course, the scroll bar can be vertically oriented, rather than horizontally oriented, in dependence upon the type of control to be implemented. However, the structure remains the same.

Within this overall structure, each of the elements of the control object can have its own ornamental appearance. Thus, for example, the background 34 of the scroll bar can be a solid color, a gradient, or have a stippled pattern. Each of the arrows 36 and 38 can have their own respective colors or be provided with drop shadows, which make them appear to be raised above the level of the background 34. Similarly, the thumb 40 can have its own characteristic shape, for example it could be circular rather than square, and can be provided with a raised design or pattern on its surface.

Figure 3:
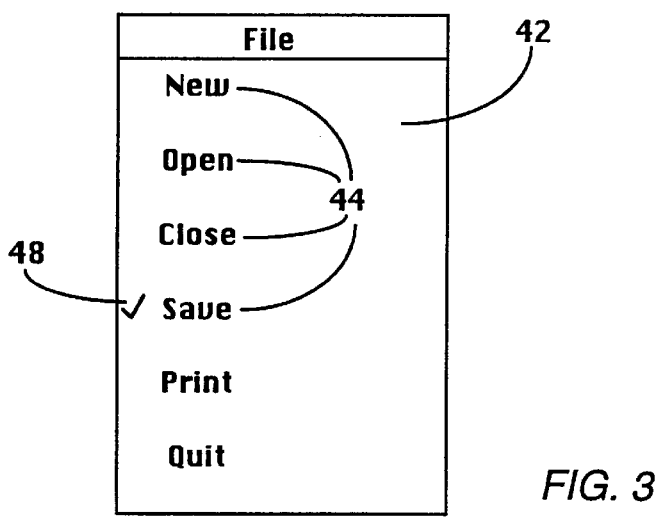
FIG. 3 is an illustration of a menu.

Similar considerations apply to menus. Referring to FIG. 3, a menu comprises a predefined rectangular shape 42 that may drop down from a menu bar or pop up on the display screen in response to actuation of a control object. Within the rectangular shape of the menu are individual entries 44 that identify the commands that are available to the user within the operation being implemented. The structure of the menu defines how far each entry is spaced from the left edge of the rectangular shape 42. If the menu includes the capability to show check marks 48 or other indicators to identify menu items that have been selected by the user, their location within the rectangle is also defined as part of the menu structure. Within this overall structure, the individual elements of a menu can have characteristic appearances. For example, the area of the rectangle which defines the background for the menu can have any desired color or contain an image. It can include a frame design around the outside edges, and the individual entries can have borders around them and background images. Similarly, the fonts and colors of the entries can be selected from a variety of choices.

In accordance with the present invention, the functionality of control and menu objects, as well as their general structure, defines different classes of objects. Thus, for example, a scroll bar defines one class of control objects. Individual objects within this class can have different ornamental appearances which are related to the overall theme of the graphical user interface. For example, a scroll bar within a conservative theme might appear as shown in FIG. 2, whereas a scroll bar for a more radical theme might have irregularly shaped triangles 36 and 38, the background might appear as a thin wavy wire, and the thumb can have the appearance of a ring or tube which surrounds the wire and slides along it. Each separate appearance of a control object has its own definition, with its own associated program code. Menus also define a separate class of objects, with associated program code that defines its structure and appearance.

Figure 4:
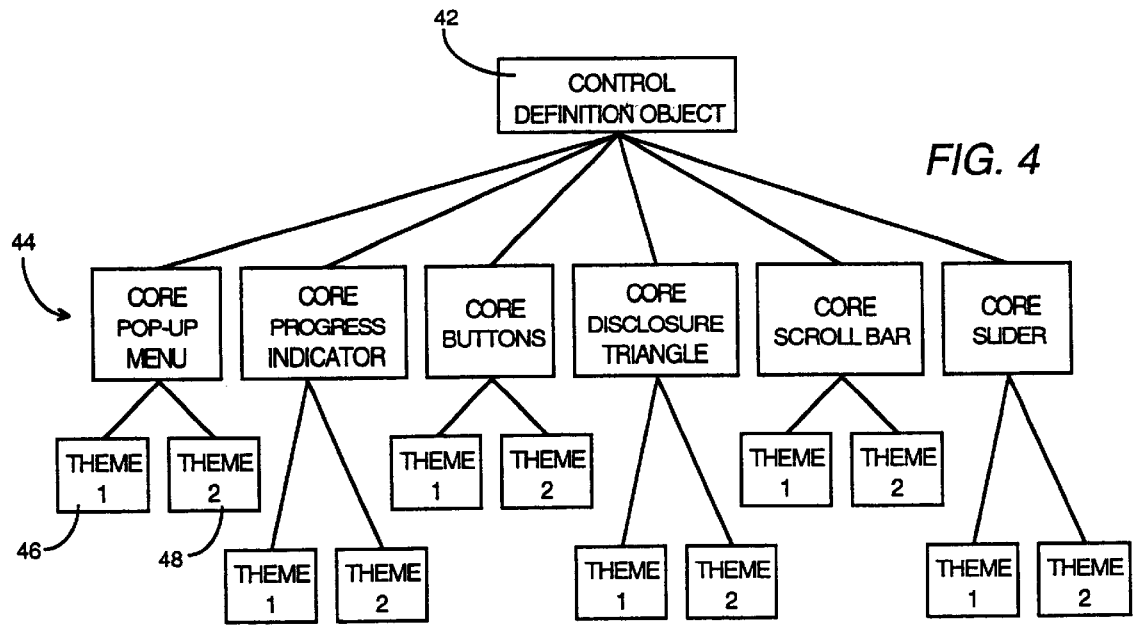
FIG. 4 is a block diagram of the hierarchical structure of the program code for control objects in accordance with the present invention.

To minimize the amount of program code that is required to implement the customizable appearance of user interface elements, core definitions are employed for each class of objects. The definitions are arranged in a hierarchial structure, where different layers of the hierarchy can be developed independently of one another. One example of such a hierarchial structure for control objects is illustrated in FIG. 4. Referring thereto, at the highest level of the hierarchy is a control definition object 50. Whenever a program, such as the operating system or an application program, requires a particular control element to be drawn on the display, it accesses this object. At the next level of the hierarchy is a set of core control classes 52. These classes derive from the control definition object 50, and implement the basic functionality and overall structural appearance of each of the control objects. It is to be noted that the set of classes depicted in FIG. 4 is not intended to be exhaustive. Other classes of objects, such as opposing arrows for incrementing or decrementing a displayed value, and icon buttons, are two other possibilities. At the third level of the structure resides the actual drawing modules that define the specific appearance of the control objects. The particular example illustrated in FIG. 4 relates to a graphical user interface that provides two different themes for the user to select. When the user selects one theme, all of the drawing modules 54 labelled "Theme 1" are loaded into the main memory 16 and used to draw the particular control objects. If the user switches to a different theme, the drawing modules 56 labelled "Theme 2" are employed.

Figure 5:
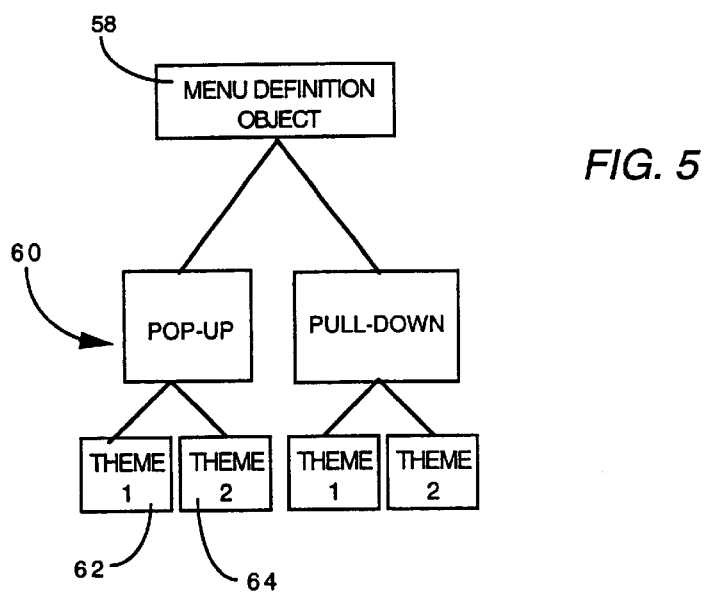
FIG. 5 is a block diagram of the hierarchical structure of the program code for menus in accordance with the present invention.

The same hierarchical structure can be employed for menus as well. FIG. 5 illustrates an example in which two different types of menus are available within the user interface, namely pull-down menus and pop-up menus. At the top level of the structure resides a menu definition object 58, which is called when a menu is to be displayed on the computer's monitor. Two core menu classes 60 are located at the next level of the hierarchy, and derive from the menu definition object 58. These core menu classes define the basic structure of the menus, as well as any inherent functionality that is associated with them, such as highlighting a command when the cursor is positioned over it. At the third level of the hierarchy are the drawing modules 62 and 64 for defining the ornamental appearance of the menus. Again, it will be appreciated that other numbers of core menu classes are possible. In this regard, if all menus have the same structure, it may be desirable to employ a single core menu class 60 at the middle level of the hierarchy.

By organizing the code for menus and control objects in this manner, a number of advantages are provided. First, the program code at the core class level of the hierarchy is reused for each instance of an object, thereby decreasing the overall size of the operating system, and hence the memory required to store it. Furthermore, since the same code is used for each instance of a user interface object, that object will always have the same functionality and general structure, regardless of the particular theme that is chosen for its appearance. The program code at this level of the hierarchy is preferably designed by the operating system developer, who thereby maintains control over the functionality and general structure of the graphical user interface. In contrast, the code at the individual theme level of the structure can be written by different developers. Basically, the code at this level of the structure consists of drawing modules for the individual graphical elements of the menus and control objects. Referring to FIG. 2, the theme code for a scroll bar consists of four drawing modules, one for each of the background 34, the direction arrows 36 and 38, and the thumb 40. The theme developer can design each of these elements to have any desired appearance. The overall structure of the scroll bar, i.e. the relative positions of the elements, as well as its functionality remains the same, however, because it is determined by the code at the core class level 44.

A further advantage of this structure is the fact that the graphical definitions can have different formats. For example, the drawing modules for each of the theme 1 elements might be hard coded, whereas those for theme 2 might employ a data driven approach. In this latter approach, the shape and/or color of each element is not fixed. Rather, information in a data structure determines each of these facets, and is interpreted by a parametric drawing procedure to actually draw the elements. The information in the data structure can be varied by the user, to thereby change the theme appearance. For further information regarding the data driven approach to the drawing of control objects, reference is made to application Ser. No. 08/243,327, the disclosure of which is incorporated herein by reference. Regardless of which drawing procedure is in place, the core class object makes a generic call to the theme module which instructs the module to draw a designated element.

Figures 6, 7:
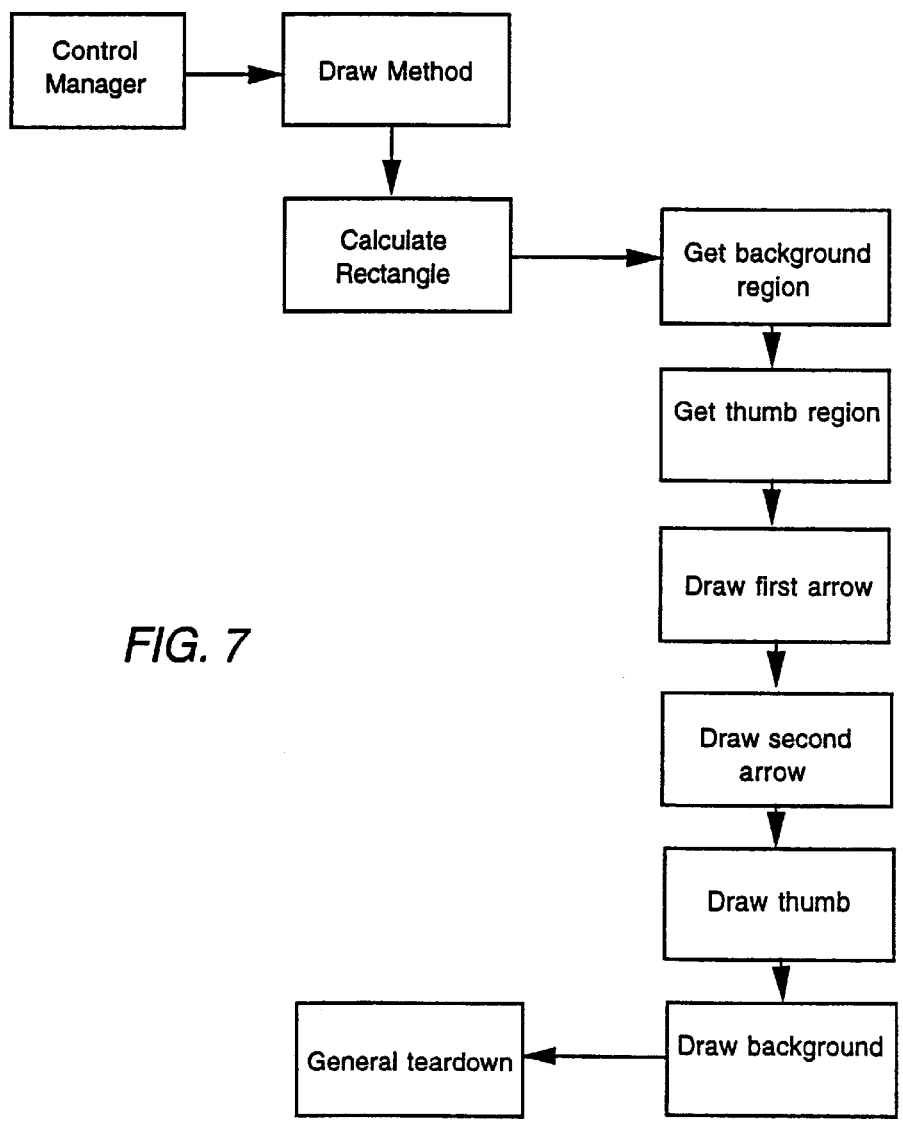
FIG. 6 is an illustration of the different states for a check box control object.
FIG. 7 is a flow chart of the procedure for drawing a scroll bar.

An example of the type of information that might be stored in each of the theme modules 54, 56 is illustrated in FIG. 6. The particular example illustrated in this figure relates to check boxes. A check box is a control element that can be selected by a user to turn a particular feature on or off. In the illustrated example, a check box can occupy one of twelve different states. There are four possible conditions which apply to a check box. It can be active, meaning that the feature associated with that check box is currently available, or inactive, in which case the feature is not currently available to the user. Alternatively, the check box can be selected, which can occur when the user positions a cursor over it, or it can be active with a keyboard highlight, in which case it toggles between different states when the user presses a predetermined key, such as the "enter" or "return" key on a keyboard. Within each of these conditions, the check box can occupy one of three states. If the check box is unchecked, the feature associated with the check box is not currently active. Alternatively, if it is checked, that feature is currently selected. The third, mixed state applies when there are further subfeatures under the one associated with the check box. The mixed state indicates that some, but not all, of the subfeatures associated with that function have been selected.

The drawing modules in the third level of the hierarchy describe the appearance of the check box for each of the twelve possible states. Thus, for the example of FIG. 4, the theme 1 module for the check box contains 12 definitions of the manner in which the check box is to be drawn on the screen of the display device 28. The particular one that is drawn will be dependent upon the actual state of the check box at that time. This information is provided to the object by the operating system or application program to which the check box relates. For example, a four-bit code can be sent from the program to the control definition object 50, which passes it on to the appropriate core class object 52. In response, the core class object instructs the drawing module 54 to draw the appropriate element for the indicated state. Similarly, the drawing modules for theme 2 also contain 12 definitions for the appearance of the check box, in accordance with the characteristics of that theme.

Each core class object 44 consists of a set of routines for calling up the appropriate drawing modules to draw each of the elements of a control object. For example, the core class object for the scroll bar may consist of the following set of commands:

Draw Scroll Bar Focus
Draw Scroll Bar Background
Draw Scroll Bar Thumb
Draw Scroll Bar Arrow
Get Scroll Bar Background Region
Get Scroll Bar Thumb Region For each command, the object identifies the area on the display where the element is to be drawn by the drawing module, in response to information provided by the application program. For those elements which can exist in more than one state, the object also indicates the state to be drawn. Thus, for the scroll bar, the background can have four possible states, namely active, pressed, inactive or disabled. The thumb can be either vertically or horizontally oriented, and within each orientation can occupy one of three states, namely active, pressed or ghost, i.e. transparent. The arrow can have one of four orientations, i.e. up, down, left or right, and within each orientation can be active, pressed, inactive or disabled. With each command, the core class object sends an indicator which identifies the particular state that is to be drawn.

The last two commands, Get Scroll Bar Background Region and Get Scroll Bar Thumb Region, return data to the control definition objects 42 which identify the actual regions within which the scroll bar background and thumb are drawn. This information is provided to a display manager, or the like, which uses it to determine the area occupied by these elements relative to other graphical elements on the display.

A flow chart which depicts the operations that are carried out to draw a scroll bar is illustrated in FIG. 7. Referring thereto, a control manager, or similar routine in the operating system which detects the need to draw a control object on the display, issues a command to the control definition object 50 to draw the desired object. In response thereto, the control definition object determines the drawing methodology that is to be employed, for example in dependence upon the selected theme. The control definition object then calculates the rectangle, or other area on the display, in which the object is to be drawn, and calls the core class object 52 for scroll bars. This object then issues the calls to the appropriate theme module 54 or 56 to get the background and thumb regions, and then to draw each of the four elements. After these steps have been completed, the control definition object 50 carries out a general teardown of the procedure, in preparation for the next for a control object from the control manager.

The same approach is employed with respect to the menu structure illustrated in FIG. 4. Because of the similarities of these two structures, a detailed example of the drawing of a menu will be omitted.

From the foregoing, it can be seen that the present invention provides a structure which permits the appearance of a graphical user interface to be readily customized, while at the same time maximizing the reuse of a substantial portion of the code for defining user interface objects, and thereby reducing the storage requirements for the code. In addition, since the functionality and general appearance of each object resides in the reused portion of the code, a greater amount of consistency is provided to the user.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced therein.

What is claimed is:

1. A graphical user interface for a computer, said interface including graphical objects that are displayed on a monitor of the computer and that are accessed by users to control the operation of the computer, said interface comprising a plurality of definitions that are respectively associated with said graphical objects, each of said definitions comprising a hierarchical set of software code modules, including:
    a first code module at one level of the hierarchy which defines the structural relationship of elements that constitute a displayed image of the graphical object; and
    a second code module at a lower level of the hierarchy which depends from said first code module, said second code module defining an appearance for each of the elements in the image of the graphical object to be displayed on the monitor.

2. The graphical user interface of claim 1 wherein a plurality of second code modules depend from each first code module, where each second code module which depends from a first code module defines a different appearance for the elements of the graphical object associated with the first code module.

3. The graphical user interface of claim 2 wherein said second code modules are alternatively selectable by a user of the computer to present different themes for the graphical user interface.

4. The graphical user interface of claim 1 wherein said graphical objects include control objects and menus.

5. The graphical user interface of claim 4 wherein the first code modules for control objects also define functionality associated with said control objects.

6. The graphical user interface of claim 1 further including a third code module at a level of the hierarchy above said first code modules, for calling one of said first code modules in response to a command to draw one of said graphical objects.

7. The graphical user interface of claim 6 wherein said third code module identifies one of a plurality of states for said one object when calling the first code module, and said first code module provides data to one of said second code modules to cause said second code module to draw said one element in said state.

8. A graphical user interface for a computer, said interface including graphical objects that are displayed on a monitor of the computer and that are accessed by users to control the operation of the computer, said interface comprising:
    a plurality of first code modules, each of which defines the structural relationship of elements that constitute a displayed image of an associated graphical object;
    a plurality of sets of second code modules which depend from said first code modules, wherein each set of second code modules includes a code module which depends from a respective one of said first code modules, each of said second code module defining an appearance for each of the elements in the image of a graphical object to be displayed on the monitor; and
    means responsive to a user command for selecting one of said sets of second code modules to controls the appearances of the graphical objects in the user interface.

9. The graphical user interface of claim 8 wherein the selection of one of said sets of second code modules controls the appearance of all of the graphical objects in the user interface.

10. The graphical user interface of claim 9 wherein said graphical objects include control objects and menus.

11. The graphical user interface of claim 10 wherein the first code modules for control objects also define functionality associated with said control objects.

12. The graphical user interface of claim 8 further including a third code module at a level of the hierarchy above said first code modules, for calling one of said first code modules in response to a command to draw one of said graphical objects.

13. The graphical user interface of claim 12 wherein said third code module identifies one of a plurality of states for said one object when calling the first code module, and said first code module provides data to a second code module from the selected set to cause said second code module to draw said one element in said state.

14. A method for organizing an architecture of a graphical user interface, the graphical user interface including graphical objects that are displayed on a monitor of a computer and that are accessed by users to control the operation of the computer, the graphical user interface comprising a plurality of definitions that are respectively associated with the graphical objects, each of the definitions comprising a hierarchical set of software code modules, the method comprising the steps of:
    ordering a first code module at one level of the hierarchy, wherein the first code module defines the structural relationship of elements that constitute a displayed image of the graphical object; and
    ordering a second code module at a lower level of the hierarchy that depends from the first code module, wherein the second code module defines an appearance for each of the elements in the image of the graphical object to be displayed on the monitor.

15. The method of claim 14, wherein a plurality of second code modules depend from each of a plurality of first code modules, wherein each of the plurality of second code modules that depends from each of the plurality of first code modules defines a different appearance for the elements of the graphical object associated with the first code module.

16. The method of claim 15, wherein the plurality of second code modules are alternatively selectable by a user of the computer to present different themes for the graphical user interface.

17. The method of claim 14, wherein the graphical objects include control objects and menus.

18. The method of claim 17, wherein the first code module for control objects also defines functionality associated with the control objects.

19. The method of claim 14, comprising the step of:
    ordering a third code module at a level of the hierarchy above the first code module, wherein the third code module calls one of a plurality of first code modules in response to a command to draw one of the graphical objects.

20. The method of claim 19, wherein the third code module identifies one of a plurality of states for one of the graphical objects when calling one of the plurality of first code modules, and wherein the one of the plurality of first code modules provides data to one of a plurality of second code modules to cause the one of the plurality of second code modules to draw the one of the graphical objects in the state.

21. A method for controlling an appearance of a graphical user interface, the graphical user interface including graphical objects that are displayed on a monitor of a computer and that are accessed by users to control the operation of the computer, the method comprising the steps of:

organizing a plurality of first code modules, wherein each of the plurality of first code modules defines a structural relationship of elements that constitute a displayed image of an associated graphical object;

organizing a plurality of sets of second code modules that depend from the plurality of first code modules, wherein each set of second code modules includes a code module that depends from a respective one of the plurality of first code modules, wherein each of the second code modules defines an appearance for each of the elements in the image of a graphical object to be displayed on the monitor; and selecting one of the plurality of sets of second code modules to control the appearances of the graphical objects in the graphical user interface.

22. The method of claim 21, wherein the selection of one of the plurality of sets of second code modules controls the appearances of all of the graphical objects in the graphical user interface.

23. The method of claim 22, wherein the graphical objects include control objects and menus.

24. The method of claim 23, wherein the plurality of first code modules for control objects also define functionality associated with the control objects.

25. The method of claim 21, comprising the step of:

organizing a third code module at a level of the hierarchy above the plurality of first code modules, wherein the third code module calls one of the plurality of first code modules in response to a command to draw one of the graphical objects.

26. The method of claim 25, wherein the third code module identifies one of a plurality of states for one of the graphical objects when calling one of the plurality of first code modules, and wherein the one of the plurality of first code modules provides data to one of a plurality of second code modules from the selected set to cause the one of the plurality of second code modules to draw the one of the graphical objects in the state.

27. A computer-readable medium, comprising:

a first portion having stored therein a graphical user interface, wherein the graphical user interface includes graphical objects that are displayed on a monitor of a computer and that are accessed by users to control the operation of the computer, the graphical user interface comprising a plurality of definitions that are respectively associated with the graphical objects, each of the definitions comprising a hierarchical set of software code modules;

a second portion having stored therein a first code module at one level of the hierarchy, wherein the first code module defines the structural relationship of elements that constitute a displayed image of the graphical object; and a third portion having stored therein a second code module at a lower level of the hierarchy that depends from the first code module, wherein the second code module defines an appearance for each of the elements in the image of the graphical object to be displayed on the monitor.

28. The computer-readable medium of claim 27, wherein a plurality of second code modules depend from each of a plurality of first code modules, wherein each of the plurality of second code modules that depends from each of the plurality of first code modules defines a different appearance for the elements of the graphical object associated with the first code module.

29. The computer-readable medium of claim 28, wherein the plurality of second code modules are alternatively selectable by a user of the computer to present different themes for the graphical user interface.

30. The computer-readable medium of claim 27, wherein the graphical objects include control objects and menus.

31. The computer-readable medium of claim 30, wherein the first code module for control objects also defines functionality associated with the control objects.

32. The computer-readable medium of claim 27, comprising:

a fourth portion having stored therein a third code module at a level of the hierarchy above the first code module, wherein the third code module calls one of a plurality of first code modules in response to a command to draw one of the graphical objects.

33. The method of claim 32, wherein the third code module identifies one of a plurality of states for one of the graphical objects when calling one of the plurality of first code modules, and wherein the one of the plurality of first code modules provides data to one of a plurality of second code modules to cause the one of the plurality of second code modules to draw the one of the graphical objects in the state.

34. A computer-readable medium, comprising:

a first portion having stored therein a graphical user interface, wherein the graphical user interface includes graphical objects that are displayed on a monitor of a computer and that are accessed by users to control the operation of the computer;

a second portion having stored therein a plurality of first code modules, wherein each of the plurality of first code modules defines a structural relationship of elements that constitute a displayed image of an associated graphical object;

a third portion having stored therein a plurality of sets of second code modules that depend from the plurality of first code modules, wherein each set of second code modules includes a code module that depends from a respective one of the plurality of first code modules, wherein each of the second code modules defines an appearance for each of the elements in the image of a graphical object to be displayed on the monitor; and a fourth portion having stored therein an object, responsive to a user command, for selecting one of the plurality of sets of second code modules to control the appearances of the graphical objects in the graphical user interface.

35. The computer-readable medium of claim 34, wherein the selection of one of the plurality of sets of second code modules controls the appearances of all of the graphical objects in the graphical user interface.

36. The computer-readable medium of claim 34, wherein the graphical objects include control objects and menus.

37. The computer-readable medium of claim 36, wherein the plurality of first code modules for control objects also define functionality associated with the control objects.

38. The computer-readable medium of claim 34, comprising:
- a fifth portion having stored therein a third code module at a level of the hierarchy above the plurality of first code modules, wherein the third code module calls one of the plurality of first code modules in response to a command to draw one of the graphical objects.

39. The computer-readable medium of claim 38, wherein the third code module identifies one of a plurality of states for one of the graphical objects when calling one of the plurality of first code modules, and wherein the one of the plurality of first code modules provides data to one of a plurality of second code modules from the selected set to cause the one of the plurality of second code modules to draw the one of the graphical objects in the state.

* * * * *